United States Patent [19]

Carrick

[11] 4,408,777
[45] Oct. 11, 1983

[54] HITCH MECHANISM

[75] Inventor: Lawrence K. Carrick, Spokane, Wash.

[73] Assignee: Calkins Manufacturing Company, Spokane, Wash.

[21] Appl. No.: 315,976

[22] Filed: Oct. 28, 1981

[51] Int. Cl.³ .......................................... A01B 59/042
[52] U.S. Cl. ................................ 280/461 A; 172/327
[58] Field of Search .......... 280/456 A, 460 A, 461 A, 280/476 R, 476 A, 474, 423 A; 172/680, 319, 324, 326, 327

[56] References Cited

U.S. PATENT DOCUMENTS 2,723,129  11/1955  Sprague ............................. 172/319
2,973,818   3/1961  Marvin ........................... 280/476 A
4,042,253   8/1977  Watts ............................. 280/476 R Primary Examiner—John A. Pekar
Attorney, Agent, or Firm—Wells, St. John & Roberts

[57] ABSTRACT

An implement hitch assembly is described that can be removably attached to an implement and to a towing vehicle. The hitch assembly includes apparatus by which the implement frame is allowed to pivot freely about a selected axis relative to the towing tongue frame when the implement is in a lowered, operative position. Pivotal motion is transferred to a different pivot axis on the hitch assembly when the implement is elevated. The former pivot axis is locked in the raised position of the implement and selected resistance to pivotal motion about the other axis is provided to enable safe transport of the implement.

28 Claims, 6 Drawing Figures

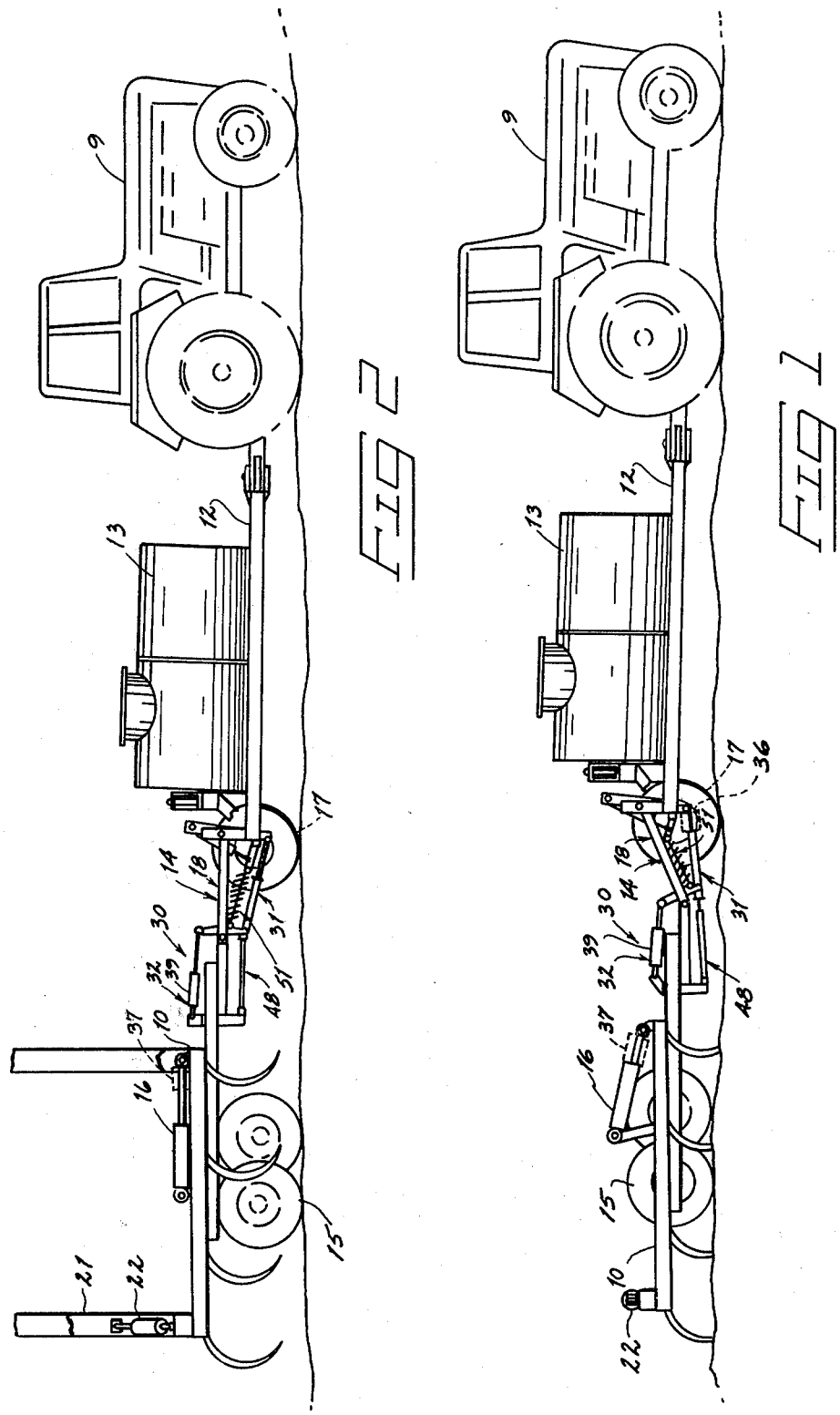

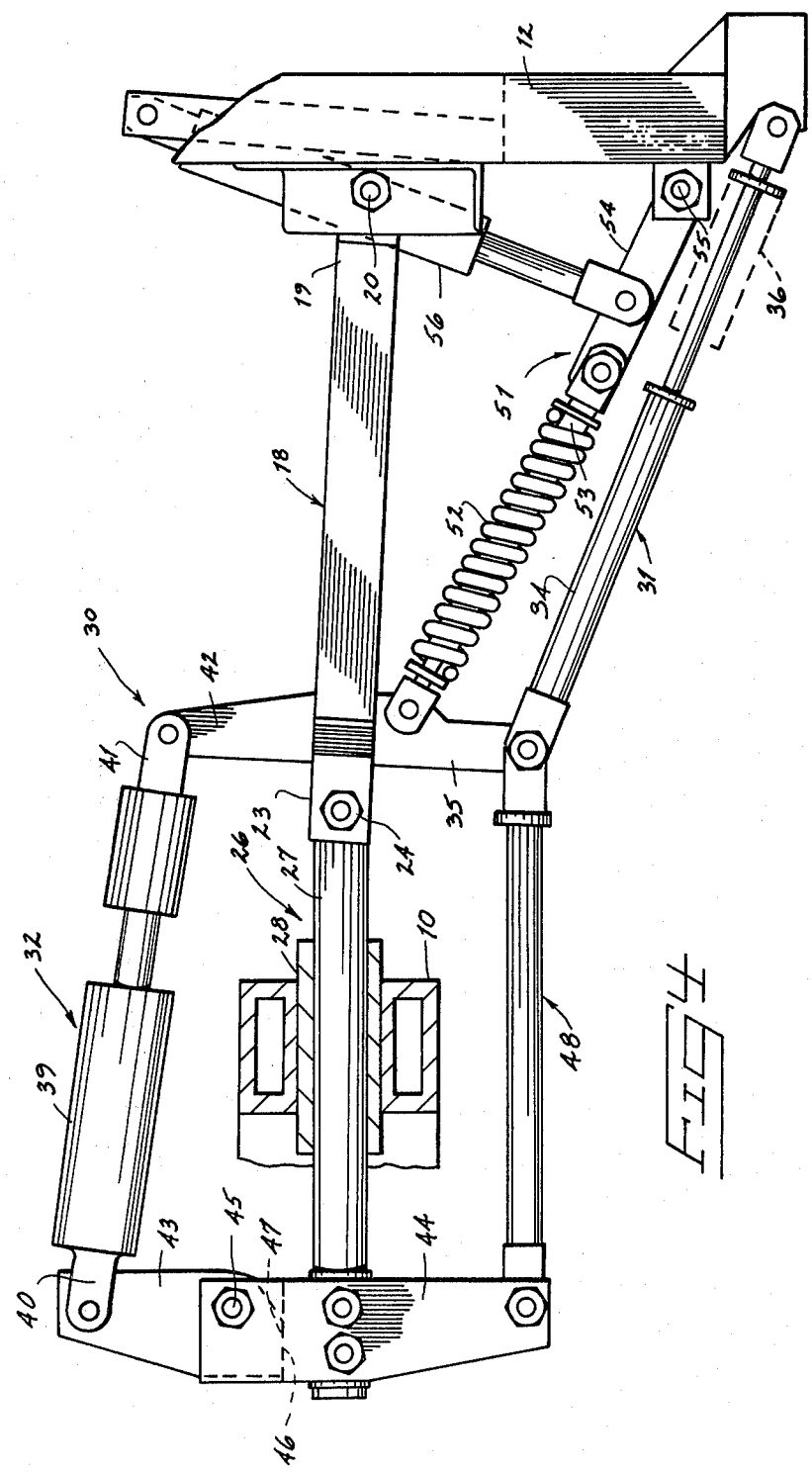

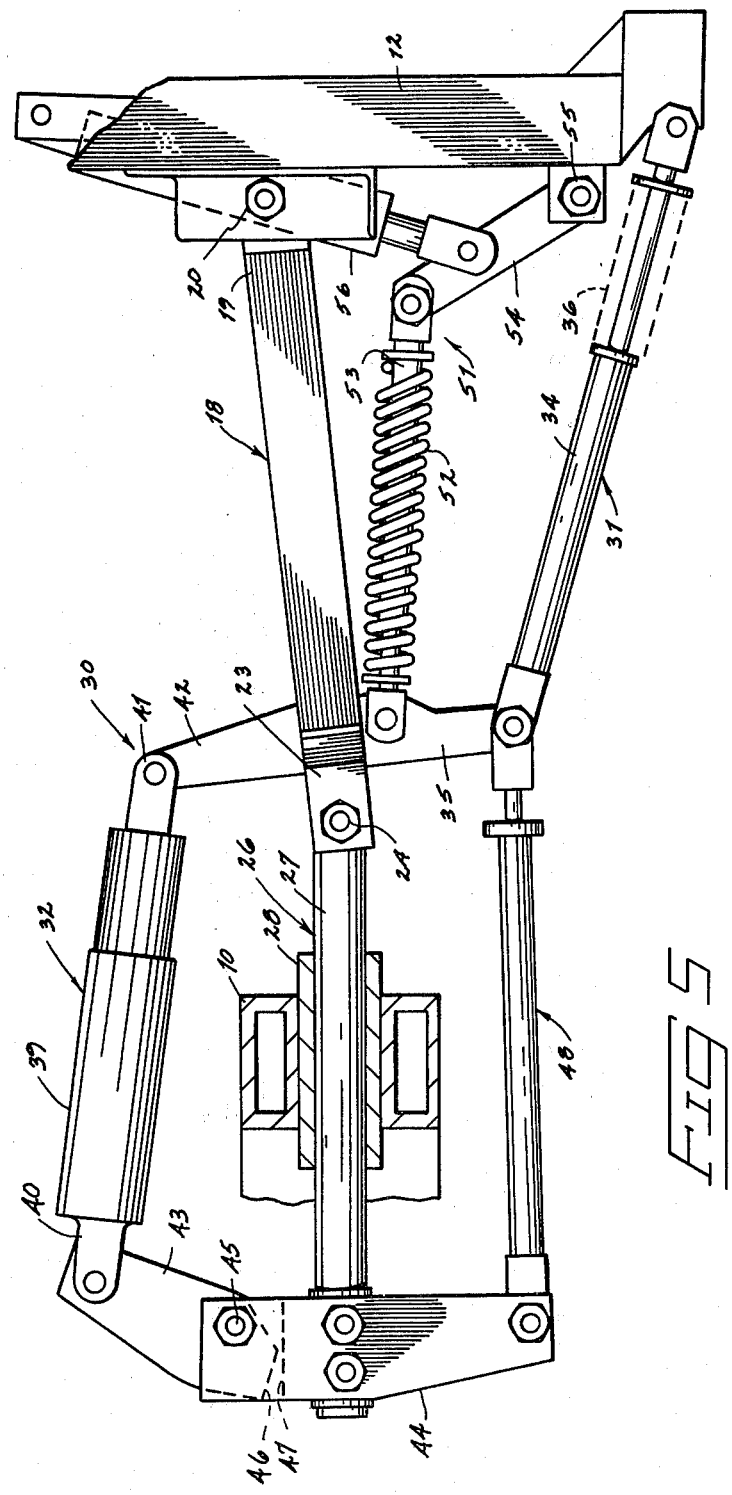

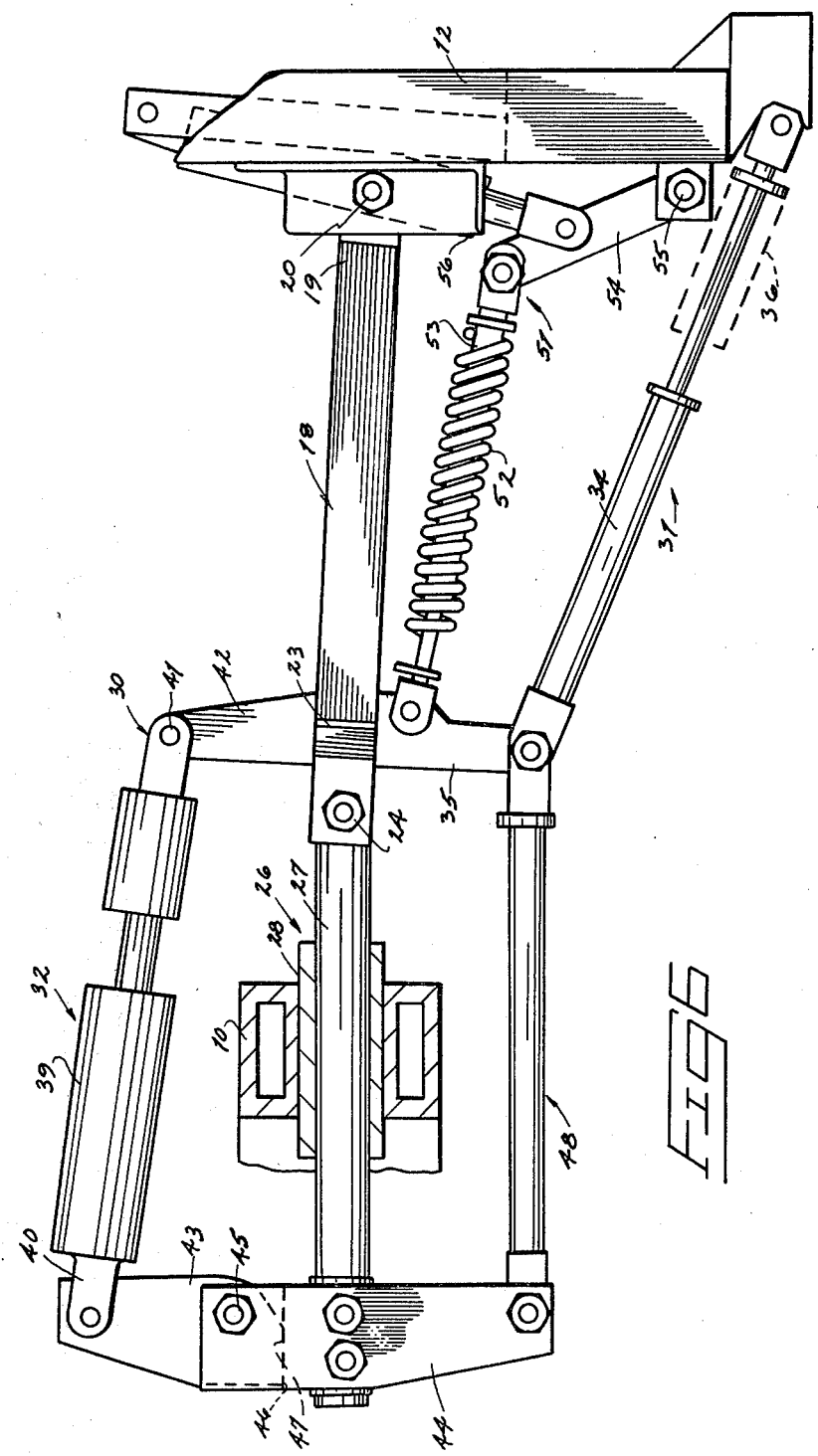

HITCH MECHANISM

BACKGROUND OF THE INVENTION

The present invention is related to hitch assemblies and particularly to such assemblies that allow pivotal movement of a towed implement frame about one axis when the implement frame is in a lowered operative condition and another pivot axis when the implement frame is in a raised, transport condition.

There is extreme interest especially in the agricultural industry to combine field operations. Fertilizer application, for example, can conceivably be combined with other field operations. The problem is how to transport the heavy tank used to hold the fertilizer. The typical tongue of an implement will not support the tank when full. The gradually decreasing weight of the tank as it empties is also a problem, since the weight affects performance of the implement. A special intermediate hitch to carry the tank would seem to be the solution. Such intermediate hitch frames have been developed, especially for carrying fertilizer tanks separate from an implement. However, they have serious shortcomings.

Modern wide implements often have "wings" or lateral extensions of the frame that fold to an upright condition when the implement is to be transported. The folded, upright portion of the frame can cause upward forces at the hitch point when the folded frame tends to tip backward due to bumpy road conditions or sudden acceleration. The weight of the full tank usually serves well to hold the front of the implement down when transporting to the field. The shortcomings referred to above come when the tank is empty and the implement is to be transported. The weight of the tank and hitch frame alone are not enough to hold the front of the implement down during transport. The result has been buckling between the implement frame and intermediate hitch frame, often with the implement falling over backward. To solve this problem, farmers have often resorted to refilling the tanks before the implement is to be transported.

The present hitch assembly solves this problem by not allowing substantial rearward pivotal motion of the folded "wings" in the transport position and by allowing relative pivotal movement between the implement and hitch frame in the lowered, operative condition. The weight of the hitch frame therefore becomes unimportant.

The tongue or hitch connector between an implement and towing vehicle must have a length approximately equal to one half of the width of the tool in order to provide sufficient control at the lateral tool ends. Therefore, a tongue of approximately 30 feet would be preferred with a tool 60 feet wide. This relationship presents no problem when the tool is drawn along a flat surface. However, in rough or rolling terrain, significant problems occur when the tool is on one hillside slope and the towing vehicle is progressing along another. The ground working implements are either levered into or out of the ground by the long tongue.

The obvious solution of providing a shorter tongue leads to even more difficult problems in controlling the progression of the tool around curves. Lateral stability of the tool ends decreases with decreasing length of the tongue or hitch.

Free pivotal movement of the implement frame relative to the hitch frame allows the implement frame to maintain its operative condition when being towed over hills or through hollows.

Also, the present hitch frame can easily be removed from one implement frame and attached to another, thereby increasing versatility of existing equipment.

It should be noted also that the present hitch assembly is not limited in its use strictly to fertilizer applications. In fact, the hitch assembly needn't be supplied with a tank or other form of carrier. It can as easily be used solely for its advantages in allowing pivotal motion of the implement frame while retaining the advantage of a long towing tongue.

BRIEF DESCRIPTION OF THE DRAWINGS

FIG. 1 is a diagrammatic view showing an implement frame, and the present hitch assembly in a lowered, operative position;

FIG. 2 is a diagrammatic view showing an implement frame, and the present hitch in a raised, transport position;

FIGS. 4, 5 and 6 are detail side elevations, partially sectioned to show the present hitch assembly and part of the implement frame in three individual operational modes.

DETAILED DESCRIPTION OF A PREFERRED EMBODIMENT

Figure 3:
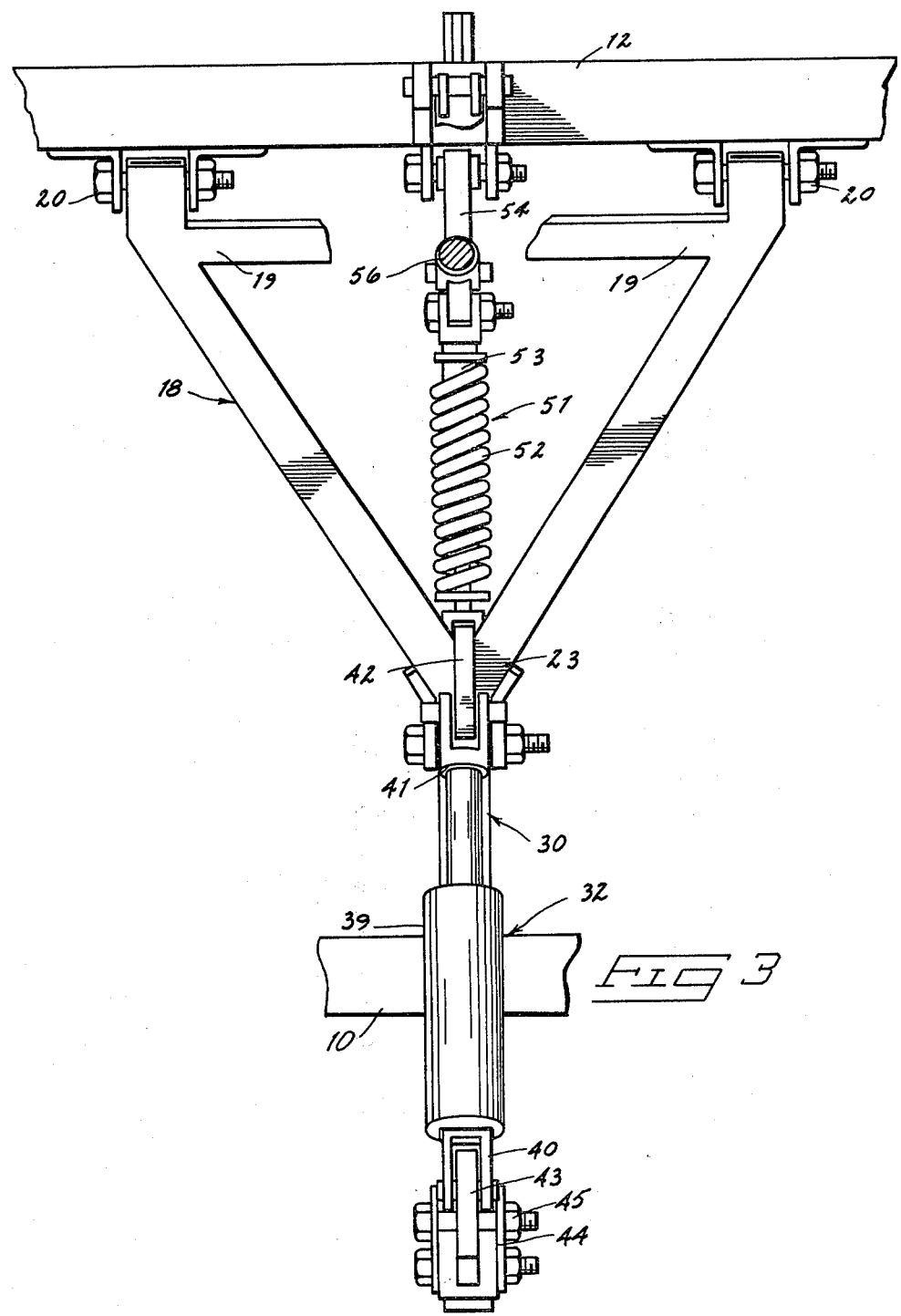
FIG. 3 is a top plan view of a portion of the present hitch assembly.

The present invention is intended for use with a towing vehicle, such as the tractor generally designated in the drawings by the number 9. For purposes of this description, the tractor 9 will include a rear towing hitch and hydraulic system (not shown) supplied as standard equipment on many tractors and trucks.

The present assembly is also intended for use in conjunction with an implement frame 10. Although other forms of implement frames can conceivably be used with the present invention, it is understood that prevalent use will be made with agricultural ground working tools, such as the cultivator shown mounted to the implement frame 10. The implement frame 10 is typically provided with wheel supports 15 (shown partially in FIGS. 1 and 2) operated by hydraulic lift cylinders 16 to raise or lower the attached ground working tools between inoperative positions above the ground surface and operative above the ground working positions. Many modern implement frames have upwardly foldable "wings" 21 that are selectively movable between lowered and raised positions by hydraulic cylinders 22.

The present hitch assembly is shown generally at 14 intermediate the tractor 9 and the implement frame 10. The hitch assembly may basically include an elongated towing tongue frame 12 mounting a fertilizer tank 13. The towing tongue frame 12 may be supported by ground engaging wheels 17. It should be noted that though a liquid fertilizer tank 13 is shown by way of example, other forms of tanks or bins can also be supported on the tongue frame. In fact, the present hitch assembly can be used without a tank or bin.

An elongated link member 18 extends between the towing tongue frame and is adapted to be mounted to the implement frame 10. The link member 18 may be "A" shaped, extending from a base 19 that is pivotally mounted to the towing tongue frame at 20 for pivotal motion about a first horizontal transverse axis. The opposite or trailing end 23 of link member 18 is pivoted at 24 about a second horizontal transverse axis. The axes at pivots 20 and 24 are preferably parallel. Furthermore, it is preferred that pivot 20 be situated forward of the rotational axis for the hitch support wheels 17 and that pivot 24 be situated a prescribed distance rearwardly of the wheel axis.

Link member end 23 is mountable to the implement frame by a pivot means 26 (FIGS. 4, 5 and 6) that allow relative pivotal motion of the implement frame 10 and towing tongue frame 12 about a horizontal longitudinal axis. This axis is preferably perpendicular to the axes at pivots 20 and 24. Pivot means 26 preferably includes a longitudinal cylindrical shaft 27 that is rotatably carried in a sleeve 28. The sleeve 28 is rigidly attached to the implement frame.

Means is generally provided at 30 for interconnecting the link member 18 and implement frame to selectively lock the link member against pivotal motion about one or the other of the pivot axes 20 or 24.

More specifically, means 30 includes a first lock means 31 that operatively interconnects the link member 18 and one of the frames for locking the link member against pivotal motion about the first axis at pivot 20 when the implement is in the lowered position. Pivotal motion of the hitch tongue frame relative to the implement thereby occurs exclusively at the second pivot 24, rearward of the hitch support wheels 17.

Means 30 also includes a second lock means 32 adapted to interconnect the link member and the remaining frame in order to lock the link member against pivotal motion about the second axis at pivot 24 when the implement frame is in the raised position. Means 30 is thereby operable to allow exclusive pivotal motion of the hitch assembly and implement frame about the first pivot 20.

A biasing means 51 selectively interacts with the first and second lock means 31 and 32 for operation in response to raising and lowering of the implement wings 21. Biasing means 51 functions, in cooperation with locking means 31 and 32, to produce selected resistance to pivotal motion of the implement frame and hitch assembly about the pivot 20 (while pivot 24 remains locked).

It may be understood from the above general descriptions that there are three basic operating modes offered through the present hitch assembly.

The first mode involves free relative pivotal motion of the hitch tongue frame 12 and implement frame about pivot 24 with the pivot 20 being locked. This mode is used when the implement is lowered to an operative working condition as shown in FIG. 1.

The second mode involves free relative pivot motion of the hitch tongue frame and implement frame about pivot 20 with the pivot 24 being locked. This mode is used when the implement is raised to an inoperative condition (without the wings raised) for "in-field" transport.

The third mode involves restricted relative pivotal motion of the hitch tongue frame and implement frame about pivot 20 with pivot 24 being locked. This mode is used when the implement is raised to an inoperative condition and with the wings 21 also raised as shown in FIG. 2.

Further detailed description of the elements comprising the first and second locking means 31 and 32, and biasing means 51 will now be given to enable a more thorough understanding of the operational interrelationships that follow.

The first lock means 31 includes a telescoping pivot stop means 34 preferably between the towing tongue and a downwardly extending bracket 35 on the link member 18. The pivot stop 34 allows pivotal motion of the link member about the first axis at pivot 20 to a selected limit defined by removable stop adjustment 36. The stop adjustment 36 (FIG. 5) is illustrated in dashed lines in FIG. 5 and corresponds with similar stop adjustments 37 (FIG. 1) on the implement wheel lifting cylinders 16. The stop adjustments 36 and 37 function as means for selectively controlling elevation of the implement frame when it is in its lowered operative condition.

The second lock means 32 includes an extensible cylinder 39. The cylinder 39 includes a base end 40 and a piston end 41. The piston end 41 is connected to an upstanding bracket 42 rigidly fixed to link member 18. The cylinder base end is connected to a bracket 43. A frame 44 fixed to the shaft 27 pivotably mounts the bracket 43 at a pivot 45.

The bracket 43, pivot 45, and frame 44 preferably comprise means for mounting this cylinder to the implement frame for free pivotal movement about the axis at pivot 45 when the implement frame has been lowered. It also functions to hold the cylinder from pivotal motion about the axis at pivot 45 when the implement frame has been raised. This is done by a flat abutment surface 46 (FIGS. 3 and 4) provided on the bottom of the bracket 43. The abutment surface 46 comes into engagement with a corresponding surface 47 on the frame 44 when the cylinder extends, limiting further pivotal motion about the axis at pivot 45.

Another telescoping stop means is provided at 48 between the bracket 35 and frame 44. The telescoping pivot stop functions to limit angular movement of the link member about the second pivot axis at 24.

The telescoping pivot stop 48 is similar to the pivot stop 34 with the exception that no adjustable stops (such as those shown at 36) are used to selectively change the "bottomed out" position.

The biasing means 51 includes an elongated compression spring 52 mounted over a telescoping rod 53. The spring, when compressed in the geometry of biasing means 51, offers resistance to downward pivotal motion of member 18 about the axis at pivot 20.

A toggle link 54 is pivotally mounted to an end of the telescoping rod 53 and a pivot 55 on the tongue frame. A cylinder 56 has its piston end mounted to the toggle link 54 and base end mounted to the tongue frame 12.

The cylinder 56 operates to pivot the toggle link 54 between an operative position (FIG. 4) wherein the compression spring is compressed between the link member 18 and tongue frame 12, and an inoperative position (FIG. 5) wherein the compression spring is relaxed, with the link member pivoted upwardly.

The cylinder 56 is preferably connected hydraulically with the wing lift cylinders to extend automatically as the wings are lifted. Similarly, the cylinder 39 is hydraulically connected with the implement lift cylinders 16 to extend as the implement cylinders raise the implement frame.

It is pointed out that the present assembly be provided as an attachment to an existing implement frame. It can in fact be provided as a removable attachment, allowing use with any appropriate implement frame. The assembly can also be provided as an integral part of the implement.

OPERATION

Operation of the present hitch assembly will be described beginning with the hitch attached to an implement frame and a tractor and assuming the relationship between the implement frame, hitch and tractor shown in FIG. 2. There the implement is in the raised condition and the wings 21 are in the upwardly folded transport position. The implement is thus in condition ready for transport to or from the field. The relationship of elements in the present hitch corresponding to this condition is the "third mode" described above and shown by FIG. 4.

It is noted from FIGS. 2 and 4 that the second lock means and biasing means 51 are operative. Pivot 24 is thereby locked and the link member has become a rigid extension of the implement frame. This effectively lengthens the lever arm from the implement support wheels and reduces the mechanical advantage of the heavy elevated wings at the pivot 20. This advantage is augmented by the biasing means 51 which yieldably brace the rigid link member 18 against the tongue frame. The spring resistance, coupled with the lengthened lever arm, make the use of weights on the hitch tongue frame unnecessary. The tank 13, if provided, need not be full to counteract lifting forces applied from the lifted wings. Instead, the lifting force is reduced through the rigid link member and is further resisted by the spring 52.

The wings 21 may be lowered in the field. This may be done by operation of the cylinders 22. The biasing means may operate in response to lowering of the wings, to shift the assembly to the "second mode" (FIG. 6). This is done automatically as cylinder 56 retracts, disengaging the spring 52 and allowing free pivotal movement about pivot 20. Pivot 24 remains locked. The spring 52 is no longer needed since the heavy wings are now pivoted down to horizontal positions and no longer tend to tip the implement frame. The frame remains elevated, though, until the cylinders 16 are actuated to lower the implement frame.

This relationship is used advantageously for "infield" transport, as when the implement is to be moved from one field location to another with the frame raised. The implement frame and hitch assembly will pivot in this mode more freely about pivot 20 as the implement is moved over the field. Also, since the wings are folded down, there is considerably less vertical force applied at pivot 20. The weight of the tongue frame alone on the rigid link member 18 is therefore sufficient to prevent undesired tipping of the implement frame.

The implement may be lowered to a ground working position (FIG. 1) after being towed to a selected starting spot. The cylinders are actuated to lower the implement frame to a selected elevation as determined by the stop adjustments 37. As this happens, cylinder 39 automatically retracts, shifting the hitch assembly to the first mode (FIGS. 1 and 5).

As cylinder 39 contracts, the bracket 43 is pivoted forwardly about its pivot 45, lifting the abutment surface 46 from the similar surface 47 on frame 44. This allows relatively free pivotal motion of the cylinder about the axis at pivot 45. The retracting cylinder 39 also "unlocks" the link member 18 to allow pivotal motion of the implement frame relative to the towing tongue frame 12 at the axis of second pivot 24. The telescoping pivot stop 48 also extends as the implement frame is lowered and the link member swings downwardly from the axis at the first pivot 20.

The telescoping pivot stop 34 closes as the implement frame is lowered. The adjustable stop 36 comes into abutment with the telescoping stop 34 as the implement frame reaches the selected lowered condition. This effectively locks the link member 18 against pivotal motion about the first axis at pivot 20. The implement frame and towing tongue frame 12 will then pivot relatively freely about the second axis at pivot 24.

During operation, constant downward force of the implement at its forward end causes a corresponding downward pressure at the second axis of pivot 24. This downward force causes the telescoping pivot stop 34 to remain "bottomed out" while the frame remains in the lowered position. The implement frame and present hitch assembly can then be used to full advantage, pivoting relative to one another as hills and hollow or valley areas are encountered.

As the tractor encounters a hill, the towing tongue frame 12 will follow the tractor 9, tipping upwardly while the implement frame remains at its desired working or operative elevation. The implement frame will be gradually moved upwardly to the angle of the incline as it reaches the inclined area.

Similarly, when the tractor crests a hill and starts down the other side, the implement frame will remain at the selected operating elevation until it too crests the hill and starts down the opposite side. The pivot 24 at its rearward location, close to the front of the implement frame, "leads" the implement steadily over hills and through hollows. The implement and associated tools will therefore stay at a prescribed operating elevation.

It should be pointed out that the tongue frame 23 remains supported by its own wheels 17 regardless of the raised or lowered condition of the implement frame by provision of the link member and pivots 20 and 24. Both pivots 20 and 24 function while the implement frame is being raised or lowered, allowing the tongue frame to remain elevationally stationary. Then, after the frame 10 reaches the selected position, one or the other of the pivots is locked to prevent the implement frame from indiscriminately tipping forward or backward.

It may become desirable to elevate the implement frame without lifting the wings in order to move the implement to another area of the field. This is done by extending the implement cylinders to hoist the implement frame up to its elevated position. The present hitch assembly automatically shifts to the second mode, locking the pivot 24 and unlocking pivot 20. The link member 18 is now a rigid extension of the implement frame yet allows relatively free pivotal motion of the implement and hitch assembly at pivot 20. Shifting of the elevated implement weight is thereby accommodated by lengthening the frame through link member 18.

Finally, when field operations are complete and it is desired to move the implement along a roadway, the wings 21 must be elevated. This is accomplished by the wing cylinders 22. The biasing means cylinder 56 operates simultaneously with cylinders 22, pivoting the toggle down and slightly compressing the spring 52. The hitch assembly is thus shifted to the third mode wherein pivot 24 remains locked and pivot 20 remains free subject to the pivotal resistance offered by the now operative spring 52. The spring is now able to assist the rigid link member 18 against forces produced by the upright wings.

It should be noted that the entire hitch assembly 14 can be provided as an attachment to existing implement frames or supplied as an integral part thereof. Also, the assembly 14 can be used with or without a tank 13 or other weight on the wheel supported tongue frame 12. It does not matter whether or not the tank, if used, is fully or empty.

I claim:

1. A hitch assembly for pivotably connecting an elongated wheel supported towing tongue frame to a trailing implement frame having support means selectively operable to elevationally move the implement frame between a raised position and a lowered position, said assembly comprising:
   an elongated link member adapted to be connected at one end to the tongue frame for pivotal motion about a first horizontal axis and at a remaining end to the implement frame for pivotal motion about a second horizontal axis;
   first lock means responsive to the support means of the trailing implement frame, interconnecting the link member and one of the frames for locking the link member against pivotal motion about the first axis in response to operation of the support means to elevationally move the implement frame to the lowered position; and
   second lock means operably connected to the support means of the trailing implement frame, interconnecting the link member and remaining frame for locking the link member against pivotal motion about the second axis in response to operation of the support means to elevationally move the implement frame to the raised position.

2. The assembly as claimed by claim 1 further comprising pivot means adapted to mount the link member to one of the frames for allowing free pivotal movement of one frame relative to the other about a longitudinal axis.

3. The assembly as claimed by claim 1 wherein the trailing implement frame support means is hydraulically operated and wherein the second lock means includes an extensible cylinder hydraulically connected to the implement frame support means and having a base end and a piston end, wherein one end is connected to the link member and the other end is operably connected to one of the frames.

4. The assembly as claimed by claim 3 wherein the second lock means is comprised of:
   stop means mountable between the implement frame and the link member for limiting angular movement of the link member about the second pivot axis;
   and means mounting the cylinder to the one frame for free pivotal movement about a cylinder mount axis when the implement frame has been lowered, and for holding the cylinder from pivotal motion about the cylinder mount axis when the implement frame has been raised.

5. The assembly as claimed by claim 1 wherein the trailing implement frame support means is hydraulically operated and further comprising biasing means hydraulically connected to the frame support means and operatively mounted between the link member and one of the frames for selectively resisting pivotal motion of the link member and the tongue frame about the first axis.

6. The assembly as claimed by claim 5 wherein the biasing means is comprised of:
   a compression spring mounted to the link member;
   a toggle link pivotably mounted between the compression spring and tongue frame; and
   a cylinder mounted at one end to the toggle link and mounted at a remaining end to the tongue frame and operable to pivot the toggle link between an operative position wherein the compression spring is compressed between the link member and tongue frame and an inoperative position wherein the compression spring is relaxed between the link member and tongue frame.

7. The assembly as claimed by claim 1 wherein the first lock means is comprised of a pivot stop means pivotably mounted to the towing tongue and to the link member, for allowing pivotal motion of the link member about the first pivot axis to a selected limit.

8. An implement hitch assembly for pivotably connecting an elongated wheel supported towing tongue frame to a trailing implement frame having support means for raising and lowering the frame, comprising:
   a link member having one end mounted to the towing tongue frame for pivotal movement thereon about a first horizontal pivot axis, and a remaining end mounted to the implement frame for pivotal movement thereon about a second horizontal pivot axis, the first and second axes being transverse to the tongue frame length and parallel to one another; and
   means operably connected to the trailing implement support means for interconnecting the link member and frames to selectively lock the link member against pivotal motion about one or the other of said axes in response to operation of the trailing implement support means to raise and lower the trailing implement frame.

9. The assembly as claimed by claim 8 further comprising pivot means adapted to mount the link member to one of the frames for allowing free pivotal movement of one frame relative to the other about a longitudinal axis.

10. The assembly as claimed by claim 8 wherein the implement support means is hydraulically operated and further comprising biasing means hydraulically connected to the support means and operatively mounted between the link member and one of the frames for selectively resisting pivotal motion of the link member and the tongue frame about the first axis.

11. The assembly as claimed by claim 10 wherein the biasing means is comprised of:
   a compression spring adapted to be mounted to the link member;
   a toggle link pivotably mounted between the compression spring and tongue frame; and
   a cylinder operatively connected to the trailing implement support means and mounted at one end to the toggle link and adapted to be mounted at a remaining end to the tongue frame and operable in response to operation of the trailing implement support means to pivot the toggle link between an operative position wherein the compression spring is compressed between the link member and tongue frame and an inoperative position wherein the compression spring is relaxed between the link member and tongue frame.

12. A farm implement, comprising:
   an implement frame;
   wheel support means movably carrying the implement frame and operable to elevationally move the implement frame between a raised inoperative position and a lowered operative position;

an elongated wheel supported tongue frame adapted to be connected to a towing vehicle;

a link member pivotably connected at one end to the tongue frame for relative pivotal motion about a first horizontal transverse pivot axis and at a remaining end to the implement frame for relative pivotal motion about a second horizontal transverse pivot axis; and means operably connected with the wheel support means interconnecting the link member, implement frame and tongue frame for locking the link member to the implement frame against pivotal movement about the second axis in response to operation of the wheel support means to move the implement frame to the raised inoperative position, and for locking the link member to the tongue frame against pivotal movement about the first axis in response to operation of the wheel support means to move the implement frame to the lowered operative position.

13. The implement as claimed by claim 12 further comprising:
pivot means mounting the link member to one of the frames for free pivotal motion about a horizontal axis that is perpendicular to the first and second axes.

14. The implement as claimed by claim 12 further comprising operating level control means releasably mountable to the wheel support means and to said means interconnecting the link member and frames, for selectively controlling the elevation of the implement frame in its lowered operative position.

15. A towing hitch assembly for attachment to a towing vehicle and for mounting a wheel supported implement frame with support means for elevationally moving the implement frame between an elevated position and a lowered position, said assembly comprising:
an elongated wheel supported tongue frame adapted to be connected to a towing vehicle;
a link member mounted at one end thereof to the tongue frame for pivotal movement about a first horizontal transverse axis and having a remaining end adapted to be mounted to the implement frame for pivotal movement about a second horizontal transverse axis; and
means operably connected to the implement frame support means and mounted on the link member and tongue frame, adapted for connection to the implement frame and operable in response to operation of the implement frame support means, for locking the link member against pivotal movement about the first axis when the implement frame is in the lowered position and for locking the link member against pivotal movement about the second axis when the implement frame is in the raised position.

16. The assembly as claimed by claim 15 further comprising:
pivot means for operably mounting the link member to the implement frame for free pivotal movement about a horizontal axis perpendicular to the first and second axes.

17. The assembly as claimed by claim 15 wherein the implement support means is hydraulically operated and wherein said means on the link member includes an extensible cylinder hydraulically connected to the implement support means having a base end and a piston end with one cylinder end connected to the link member and the remaining end adapted for connection to one of the frames.

18. The assembly as claimed by claim 15 further comprising biasing means operably connected to the implement support means and operatively mounted between the link member and one of the frames for selectively resisting pivotal motion of the link member and the tongue frame about the first axis.

19. The assembly as claimed by claim 18 wherein the implement support means is hydraulically operated and wherein the biasing means is comprised of:
a compression spring adapted to be mounted to the link member;
a toggle link pivotably mounted between the compression spring and tongue frame; and
a cylinder hydraulically connected to the implement support means and mounted at one end of the toggle link and adapted to be mounted at a remaining end to the tongue frame and operable to pivot the toggle link between an operative position wherein the compression spring is compressed between the link member and tongue frame and an inoperative position wherein the compression spring is relaxed between the link member and tongue frame.

20. A hitch assembly for attachment to a towing vehicle and for mounting a wheel supported implement frame with support means for raising and lowering the frame and foldable wings with means for pivoting the wings between substantially vertical elevated positions and lowered horizontal positions, said hitch assembly comprising:
an elongated wheel supported tongue frame adapted to be connected to the towing vehicle;
a link member mounted at one end thereof to the tongue frame for pivotal movement about a first horizontal transverse axis and having a remaining end adapted to be mounted to the implement frame for pivotal movement about a second horizontal transverse axis;
first lock means operable in response to operation of the support means of the wheel supported implement frame operably connecting the link member and the tongue frame for shifting the hitch assembly into a first mode in which the tongue frame is free to pivot about the second axis by locking the link member against pivotal motion about the first pivot axis in response to operation of the support means of the wheel supported implement frame to lower the implement frame to its lowered position;
second lock means operably connected to the support means of the wheel supported implement frame operably connecting the link member and implement frame for shifting the hitch assembly into a second mode in which the tongue frame is free to pivot about the first axis and locked against pivotal motion about the second axis in response to operation of the support means of the wheel supported implement frame to lift the implement frame to its raised position; and
biasing means responsive to operation of the means for pivoting the foldable wings to lift the wings to their elevated positions operably connecting the tongue frame and link member for shifting the hitch assembly into a third mode in which the biasing means offers yieldable resistance to pivotal motion of the link member about the first axis.

21. The assembly as claimed by claim 20 further comprising pivot means adapted to mount the link member to one of the frames for allowing free pivotal movement of one frame relative to the other about a longitudinal axis.

22. The assembly as claimed by claim 20 wherein the implement support means is hydraulically operated and wherein the second lock means includes an extensible cylinder hydraulically connected to the implement support means and having a base end and a piston end, wherein one end is connected to the link member and the other end is operably connected to one of the frames.

23. The assembly as claimed by claim 22 wherein the second lock means is comprised of:
   stop means mountable between the implement frame and the link member for limiting angular movement of the link member about the second pivot axis;
   and means mounting the cylinder to the one frame for free pivotal movement about a cylinder mount axis when the implement frame has been lowered, and for holding the cylinder from pivot motion about the cylinder mount axis when the implement frame has been raised.

24. The assembly as claimed by claim 20 wherein the implement support means is hydraulically operated and wherein the biasing means is comprised of:
   a compression spring mounted to the link member;
   a toggle link pivotably mounted between the compression spring and tongue frame; and
   a cylinder hydraulically connected to the implement support means mounted at one end to the toggle link and mounted at a remaining end to the tongue frame and operable to pivot the toggle link between an operative position wherein the compression spring is compressed between the link member and tongue frame and an inoperative position wherein the compression spring is relaxed between the link member and tongue frame.

25. The assembly as claimed by claim 20 wherein the first lock means is comprised of a pivot stop means pivotably mounted to the towing tongue and to the link member, for allowing pivotal motion of the link member about the first pivot axis to a selected limit.

26. The assembly as claimed by claim 20 wherein the first axis is slightly forward of the axis for the wheels of the wheel supported tongue frame.

27. The assembly as claimed by claim 20 wherein the second axis is rearward of the axis for the wheels of the wheel supported tongue frame.

28. An implement hitch assembly for pivotably connecting an elongated wheel supported towing tongue frame to a trailing implement frame having support means for raising and lowering the frame, comprising:
   a link member having one end mounted to the towing tongue frame for pivotal movement thereon about a first horizontal pivot axis, and a remaining end mounted to the implement frame for pivotal movement thereon about a second horizontal pivot axis, the first and second axes being transverse to the tongue frame length and parallel to one another; and
   means operably connected to the trailing implement support means for interconnecting the link member and frames to selectively lock the link member against pivotal motion about one or the other of said axes in response to operation of the trailing implement support means to raise and lower the trailing implement frame;
   biasing means operatively mounted between the link member and one of the frames for selectively resisting pivotal motion of the ink member and the tongue frame about the first axis;
   and wherein the biasing means includes:
   a compression spring adapted to be mounted to the link member;
   a toggle link pivotably mounted between the compression spring and tongue frame; and
   a cylinder operably connected to the trailing implement frame support means mounted at one end to the toggle link and adapted to be mounted at a remaining end to the tongue and operable to pivot the toggle link between an operative position wherein the compression spring is compressed between the link member and tongue frame and an inoperative position wherein the compression spring is relaxes between the link member and tongue frame in response to operation of the implement frame support means.

* * * * *